(12) United States Patent
Ishihara

(10) Patent No.: US 10,352,211 B2
(45) Date of Patent: Jul. 16, 2019

(54) EXHAUST GAS PURIFICATION FILTER AND METHOD OF PRODUCING THE SAME

(71) Applicant: DENSO CORPORATION, Kariya, Aichi-pref. (JP)

(72) Inventor: Mikio Ishihara, Anjo (JP)

(73) Assignee: DENSO CORPORATION, Kariya (JP)

( * ) Notice: Subject to any disclaimer, the term of this patent is extended or adjusted under 35 U.S.C. 154(b) by 377 days.

(21) Appl. No.: 14/606,379

(22) Filed: Jan. 27, 2015

(65) Prior Publication Data

US 2015/0211397 A1    Jul. 30, 2015

(30) Foreign Application Priority Data

Jan. 27, 2014  (JP) .................. 2014-011954
Sep. 30, 2014  (JP) .................. 2014-200951

(51) Int. Cl.
*B01D 46/00* (2006.01)
*B01D 46/24* (2006.01)
*F01N 3/022* (2006.01)

(52) U.S. Cl.
CPC ....... *F01N 3/0222* (2013.01); *B01D 46/0001* (2013.01); *B01D 46/244* (2013.01); *B01D 46/2459* (2013.01); *B01D 2046/2496* (2013.01); *F01N 2330/30* (2013.01); *F01N 2330/60* (2013.01); *Y02T 10/20* (2013.01)

(58) Field of Classification Search
None
See application file for complete search history.

(56) References Cited

U.S. PATENT DOCUMENTS

| | | | |
|---|---|---|---|
| 5,595,581 A | | 1/1997 | Ichikawa et al. |
| 7,723,250 B2 * | | 5/2010 | Hayashi ............. C04B 35/195 |
| | | | 264/631 |
| 2002/0078667 A1 | | 6/2002 | Ishihara et al. |
| 2002/0189217 A1 | | 12/2002 | Ishihara et al. |
| 2003/0165662 A1 | | 9/2003 | Suwabe et al. |
| 2004/0068971 A1 | | 4/2004 | Kuki et al. |
| 2004/0161373 A1* | | 8/2004 | Ichikawa ........... B01D 46/0001 |
| | | | 422/180 |

(Continued)

FOREIGN PATENT DOCUMENTS

JP    S62-149316    7/1987
JP    H07-332064    12/1995

(Continued)

*Primary Examiner* — Duane Smith
*Assistant Examiner* — Brit E. Anbacht
(74) *Attorney, Agent, or Firm* — Nixon & Vanderhye P.C.

(57) ABSTRACT

An exhaust gas purification filter collects PM contained in and purifies exhaust gas emitted from a gasoline direct injection engine. The exhaust gas purification filter has a honeycomb structural body which has a plurality of cells, partition walls and plug members. Each of the cells is surrounded by the partition walls. An opening section of one end of each of the cells is plugged by a plug member. The plug members satisfies a relationship of L/D≤50 and L≤3, where L is an average length (mm) of the plug members and D is an average pore size mm of the plug members. The honeycomb structural body and the plug members are made of cordierite. The cordierite contains silica, talc, kaolin, alumina and/or aluminum hydroxide, etc.

14 Claims, 6 Drawing Sheets

AXIAL DIRECTION

(56) References Cited

U.S. PATENT DOCUMENTS

| | | | |
|---|---|---|---|
| 2005/0153099 A1* | 7/2005 | Yamada | B01D 53/9454 428/117 |
| 2005/0175514 A1* | 8/2005 | Ohno | B01J 35/04 422/177 |
| 2006/0112669 A1 | 6/2006 | Yamada et al. | |
| 2006/0185335 A1* | 8/2006 | Ichikawa | B01D 46/0001 55/523 |
| 2006/0213163 A1* | 9/2006 | Taoka | B01D 39/2068 55/523 |
| 2008/0083202 A1* | 4/2008 | Kunieda | B01D 39/2068 55/523 |
| 2008/0307760 A1* | 12/2008 | Chatlani | B01D 46/244 55/523 |
| 2010/0257830 A1* | 10/2010 | Mizutani | B01D 46/0001 55/523 |
| 2011/0212831 A1* | 9/2011 | Goto | B01D 46/2474 502/100 |
| 2012/0317946 A1 | 12/2012 | Miyairi | |
| 2013/0247525 A1 | 9/2013 | Tsuchiya et al. | |
| 2015/0151232 A1 | 6/2015 | Tsuchiya et al. | |

FOREIGN PATENT DOCUMENTS

| | | |
|---|---|---|
| JP | 2002-256842 | 9/2002 |
| JP | 2003-003823 | 1/2003 |
| JP | 2003-236322 | 8/2003 |
| JP | 2004-130229 | 4/2004 |
| JP | 2006-016991 A | 1/2006 |
| JP | 2006-116483 | 5/2006 |
| JP | 2006-272183 | 10/2006 |
| JP | 2008-037722 | 2/2008 |
| JP | 2010-104952 | 5/2010 |
| JP | 2010-104955 | 5/2010 |
| JP | 2010-104957 | 5/2010 |
| JP | 2013-002391 A | 1/2013 |

\* cited by examiner

AXIAL DIRECTION

AXIAL DIRECTION

◆ GASOLINE DIRECT INJECTION ENGINE
● DIESEL ENGINE

EXHAUST GAS PURIFICATION FILTER AND METHOD OF PRODUCING THE SAME

CROSS-REFERENCE TO RELATED APPLICATION

This application is related to and claims priority from Japanese Patent Applications No. 2014-11954 filed on Jan. 27, 2014 and No. 2014-200951 filed on Sep. 30, 2014, the contents of which are hereby incorporated by reference.

BACKGROUND OF THE INVENTION

1. Field of the Invention

The present invention relates to exhaust gas purification filters and methods of producing exhaust gas purification filters, capable of purifying exhaust gas emitted from internal combustion engines, in particular, gasoline direct injection engines.

2. Description of the Related Art

It is generally known for exhaust gas emitted from a diesel engine to contain particulate matter (PM) such as carbon particles, etc. Such PM causes air pollution which is the introduction of particulates, biological molecules, or other harmful materials into the Earth's atmosphere, possibly causing disease or death to humans, damage to other living organisms such as food crops, or to the natural or built environment. In order to regulate an amount of the discharge of harmful industrial waste such as PM, each country has air pollution control laws.

By the way, diesel automobiles of diesel engines are equipped with an exhaust gas purification filter in order to eliminate PM from exhaust gas emitted from diesel engines. That is, the exhaust gas purification filters filter and collect PM contained in exhaust gas. For example, a patent document, Japanese patent laid open publication No. H07-332064 has disclosed an exhaust gas purification filter comprised of a honeycomb structural body. This honeycomb structural body has a plurality of cells and partition walls. The cells are surrounded by the partition walls and formed along a longitudinal direction of the honeycomb structural body. An opening of one end of each of the cells is plugged by a plug member.

Recently, because the vehicle emissions control of reducing motor vehicle emissions is becoming stricter year by year in view of environmental protection, there is a strong demand to decrease PM such as carbon contained in exhaust gas emitted from gasoline direct injection engines of gasoline vehicles in addition to diesel engines of diesel vehicles and more improve a fuel efficiency of vehicles. In particular, it has been pointed out that gasoline direct injection engines emit PM which is smaller in particle size than that emitted from diesel engines.

In general, diesel engines emit exhaust gas which contains PM having an average particle size within a range of 60 to 100 nm. On the other hand, gasoline direct injection engines emit exhaust gas which contains PM having an average particle size within a range of 40 to 80 nm. Accordingly, because there is a possible emission control in the future on the basis of the number of PM particles in addition to an amount of PM, it has been strongly considered that gasoline vehicles should be equipped with an exhaust gas purification filter in order to filter PM from exhaust gas.

However, in general, exhaust gas emitted from gasoline engines such as gasoline direct injection engines has a high temperature which is higher than a temperature of exhaust gas emitted from diesel engines. For example, diesel engines emit exhaust gas having a temperature within a range of 150 to 400° C. On the other hand, gasoline direct injection engines emit exhaust gas having a temperature within a range of 350 to 700° C. For this reason, exhaust gas emitted from the gasoline direct injection engines has an expanded volume more than a volume of exhaust gas emitted from diesel engines. When gasoline vehicles use an exhaust gas purification filter for use in diesel vehicles in order to filter and collect PM, a pressure loss of the exhaust gas purification filter increases. This decreases an output torque of the engine. Accordingly, there is a strong demand to adequately collect PM while suppressing increasing of the pressure loss of the exhaust gas purification filter.

SUMMARY

It is therefore desired to provide an exhaust gas purification filter and a method of producing the exhaust gas purification filter capable of adequately filtering and collecting PM emitted from exhaust gas and adequately decreasing a pressure loss of the exhaust gas purification filter.

An exemplary embodiment provides an exhaust gas purification filter capable of collecting particulate matter emitted from various types of internal combustion engines, in particular, gasoline direct injection engines. That is, the exhaust gas purification filter according to an exemplary embodiment purifies exhaust gas emitted from gasoline direct injection engines with high efficiency. The exhaust gas purification filter has a honeycomb structural body comprised of a plurality of cells, partition walls and plug members. Each of the cells is surrounded by the partition walls. Each of the plug members is formed in an opening section at one end of each of the cells in order to plug the opening section of the cell. In particular, the plug members satisfy a relationship of $L/D \leq 50$ and $L \leq 3$, where L is an average length (mm) of the plug members and D is an average pore size (mm) of the plug members.

In accordance with another exemplary embodiment, there is provided a method of producing the exhaust gas purification filter previously described. The method has a step of injecting slurry into opening sections of the cells on end surfaces of a honeycomb structural body by using a dispenser. That is, the feeding step feeds the slurry into the opening sections of the cells in the end surfaces of the honeycomb structural body. The method further has a step of firing the honeycomb structural body having the plug members to produce the exhaust gas purification filter.

As previously described, the exhaust gas purification filter according to the exemplary embodiment satisfies the relationship of $L/D \leq 50$ and $L \leq 3$. The reference character L is an average length (mm) of the plug members. The reference character D is an average pore size (mm) of the plug members. This structure makes it possible to adequately decrease a pressure loss of the exhaust gas purification filter. In addition this future, the exhaust gas purification filter is used for gasoline direct injection engines. Accordingly, even if the exhaust gas purification filter satisfies the relationship of $L/D \leq 50$ and $L \leq 3$, it is possible for the exhaust gas purification filter to collect PM contained in exhaust gas emitted from gasoline direct injection engines. The exhaust gas is thereby purified. The reason why is as follows.

In general, gasoline direct injection engines emit exhaust gas having a temperature which is higher than a temperature of exhaust gas emitted from diesel engines. There is a certain tendency for PM emitted from gasoline direct injection engines to have a smaller average particle size as compared with an average particle size of PM contained exhaust gas emitted from diesel engines. Brownian motion therefore has a greater effect on the PM collection of the exhaust gas purification filter according to the exemplary embodiment for use in gasoline direct injection engines. Accordingly, even if the exhaust gas purification filter which satisfies the relationship of L/D≤50 and L≤3, it is possible to adequately and effectively collect PM contained in exhaust gas emitted from gasoline direct injection engines while decreasing and maintaining its pressure loss.

Further, the method performs the feeding step and the firing step to produce the exhaust gas purification filter. In particular, the feeding step uses a dispenser to supply slurry in opening sections of cells on ends of the honeycomb structural body to form the plug members in a predetermined pattern so that the opening section of each of the cells is plugged by the plug member. After the feeding step, the method performs the firing step to fire and sinter the honeycomb structural body with the plug members to produce the exhaust gas purification filter. In particular, the plug members satisfy the relationship of L/D≤50 and L≤3 as previously described. The exhaust gas purification filter produced by the method can adequately collect particulate matter contained in exhaust gas emitted from gasoline direct injection engines while maintaining a reduced pressure loss.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
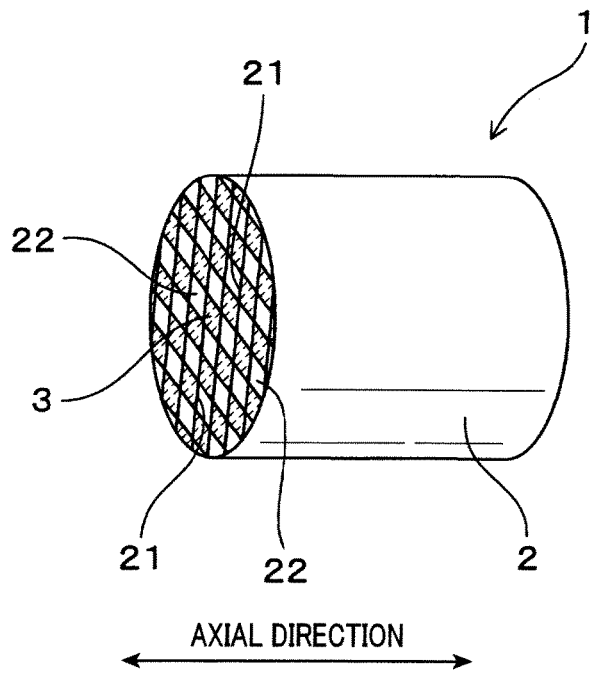
FIG. 1 is a perspective view showing an exhaust gas purification filter according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

A description will be given of an exhaust gas purification filter according to preferred exemplary embodiments of the present invention. For example, the exhaust gas purification filter according to an exemplary embodiment is mounted on motor vehicles having a gasoline direct injection engine or a diesel engine in order to filter and collect particulate matter (PM) contained in exhaust gas emitted from the engine. In general, at least two types of honeycomb structural bodies, i.e. a first type and a second type of honeycomb structural bodies are arranged on an exhaust gas pipe connected to a gasoline direct injection engine. The first type of honeycomb structural body has no plug members. The second type of honeycomb structural body has plug members. The first type of honeycomb structural body has a plurality of cells formed in a longitudinal direction without any plug member. On the other hand, the second type of honeycomb structural body has a plurality of cells formed in a longitudinal direction, and one end of each of the cells is plugged by the plug member. Further, catalyst such as noble metal is supported in the second type of honeycomb structural body.

The first type of honeycomb structural body is referred to as a start catalyst (S/C). The second type of honeycomb structural body is referred to as an underfloor catalyst (UF/C).

It is also possible to arrange another honeycomb structural body at a location after the UF/C or at a location nearer the S/C, between the S/C and the UF/C.

In addition, it is also possible to arrange the exhaust gas purification filter instead of the S/C or UF/C. When using the exhaust gas purification filter instead of the S/C or UF/C, it is preferable for the exhaust gas purification filter to support catalyst made of noble metal, etc., therein.

The honeycomb structural body according to a preferred exemplary embodiment of the present invention has a cross section of a circle shape, a polygonal shape (for example, a square shape, a hexagonal shape, etc.), which is perpendicular to an axial direction as a longitudinal direction of the honeycomb structural body. The honeycomb structural body has a plurality of cells and partition walls. Each of the cells is surrounded by the partition walls. Each of the partition walls has a thickness within a range of 0.1 to 0.3 mm, for example. The honeycomb structural body has a porosity within a range of 40 to 70%, for example.

For example, a method of producing the exhaust gas purification filter has a raw material feeding process, an extrusion and shaping process, a drying process and a firing process. Although the raw material feeding process uses a honeycomb structural body which has been treated by the firing process, it is possible to use the honeycomb structural body before the firing process. In this case, the firing process performs a sintering of the honeycomb structural body and the plug members simultaneously.

The honeycomb structural body is made of cordierite, SiC, aluminum titanate, etc. It is also preferable to form the honeycomb structural body and the plug members by using the same material. When using the same material, it is possible to perform sintering of the honeycomb structural body and the plug members simultaneously by the same sintering (firing) condition. This makes it possible to easily produce the exhaust gas purification filter. It is preferable to form the honeycomb structural body and the plug members by using cordierite.

First Exemplary Embodiment

A description will be given of an exhaust gas purification filter 1 according to a first exemplary embodiment with reference to FIG. 1 to FIG. 6.

FIG. 1 is a perspective view showing the exhaust gas purification filter 1 according to the first exemplary embodiment.

As shown in FIG. 1, the exhaust gas purification filter 1 according to the first exemplary embodiment has a honeycomb structural body 2. The honeycomb structural body 2 has a plurality of cells 22 and partition walls 21. Each of the cells 2 is surrounded by the partition walls 21. In the exhaust gas purification filter 1, each of the cells 22 has ends 23 and 24. The end 23 of the honeycomb structural body is arranged at the upstream side of the cells 22, through which exhaust gas is introduced into the honeycomb structural body 2. On the other hand, the end 24 of the honeycomb structural body is arranged at the downstream side of the cells 22, through which exhaust gas is discharged. In each of the cells 22, one end 23 or 24 is plugged with a plug member 3. In the exhaust gas purification filter 1 according to the first exemplary embodiment, the honeycomb structural body 2 and the plug members 3 have a porous structure and are made of cordierite.

Figure 2:
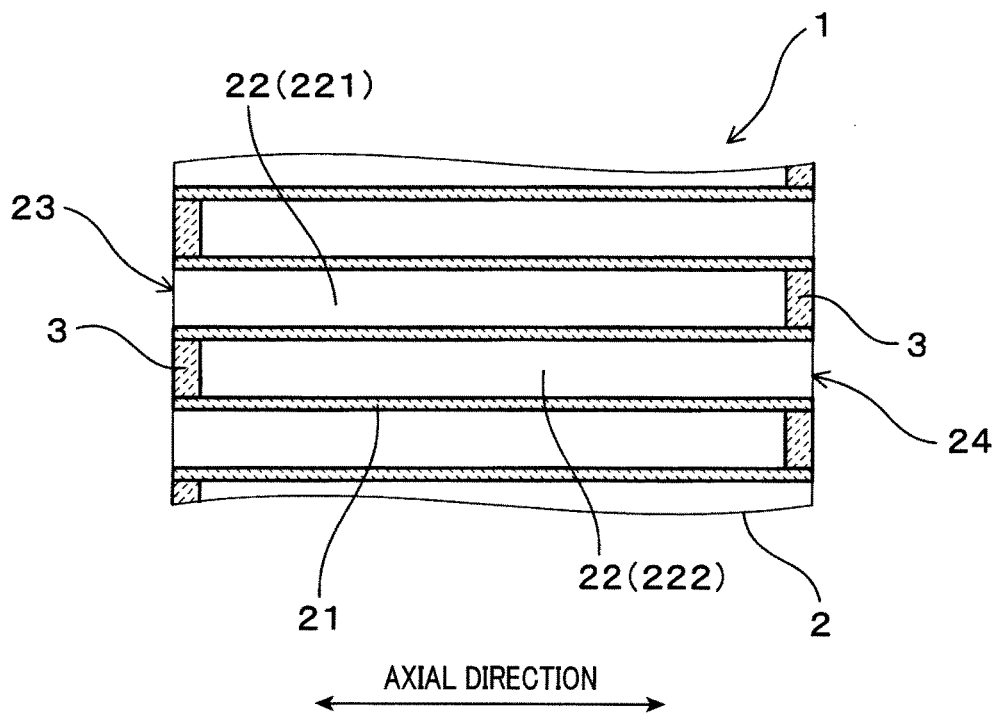
FIG. 2 is a view showing a partial cross section in an axial direction of the exhaust gas purification filter according to the first exemplary embodiment of the present invention.

FIG. 2 is a view showing a partial cross section in an axial direction of the exhaust gas purification filter 1 according to the first exemplary embodiment.

As shown in FIG. 2, the cells 22 are composed of introduction cells 221 and discharge cells 222. The end 24 at the downstream side of each of the introduction cells 221 is plugged with the plug member 3. The end 23 at the upstream side of each of the discharge cells 221 is plugged with the plug member 3.

As shown in FIG. 1 and FIG. 2, the plug members 3 are arranged in a lattice pattern arrangement on each of the end surfaces of the honeycomb structural body 2 so that the plug members 3 are alternately arranged on the end surface of the honeycomb structural body 2. In other words, on the end surface at the upstream side of the honeycomb structural body 2, the end 23 of each of the discharge cells 222 is open and the end 24 of each of the introduction cells 221 is open.

The honeycomb structural body 2 has a cylindrical shape having a 129 mm diameter and a 129 mm length. The partition wall 21 has a thickness T of 0.20 mm (8 mil). The cells 22 have a 400 cells/inch$^2$ (62 cells/cm$^2$). The cells 22 have a 1.1 mm opening pitch. The honeycomb structural body 2 has a 18 μm pore diameter, and a 62% porosity.

In the exhaust gas purification filter 1 according to the first exemplary embodiment, the plug members 3 has a predetermined length measured from the end surface 23 (the end surface 24) in the honeycomb structural body 2. In the first exemplary embodiment, the structure of the honeycomb structural body 2 satisfies the relationship of L/D≤50, and L≤3, where L is an average length (mm) of the plug members 3, D is an average diameter (mm) of the plug members 3. Specifically, the exhaust gas purification filter 1 according to the first exemplary embodiment has the following parameters, L=2.2 mm, D=0.052 mm (52 μm), L/D=42. The plug members 3 has a 61% porosity (P=61%).

Figure 4:
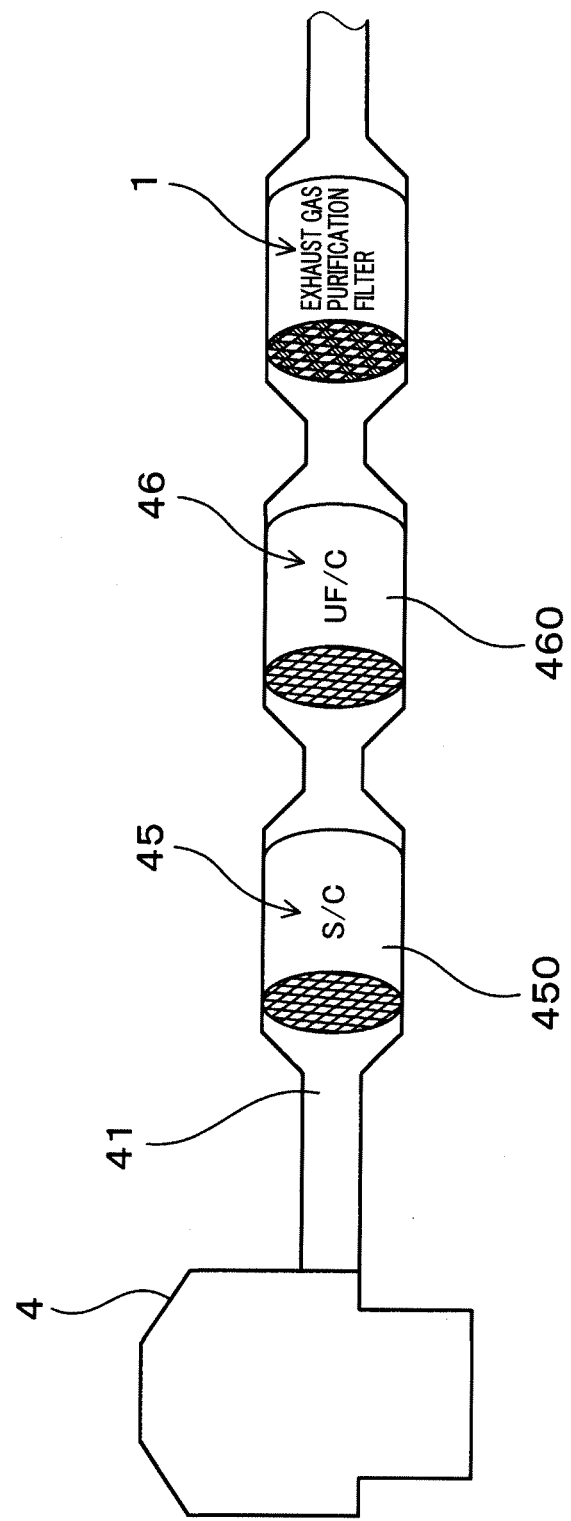
FIG. 4 is a view showing an exhaust gas passage of a gasoline direct injection engine equipped with the exhaust gas purification filter according to the first exemplary embodiment of the present invention.

FIG. 4 is a view showing a exhaust gas passage of a gasoline direct injection engine equipped with the exhaust gas purification filter 1 according to the first exemplary embodiment.

As shown in FIG. 4, the exhaust gas purification filter 1 according to the first exemplary embodiment is used in a gasoline direct injection engine 4.

A start catalyst (S/C) 45 and an underfloor catalyst (UF/C) 46 are mounted on an exhaust gas passage 42 which is connected to the gasoline direct injection engine 4. The S/C 45 is arranged at the upstream side of the exhaust gas passage 41. The UF/C 46 is arranged at the downstream side of the exhaust gas passage 41. The S/C 45 has a honeycomb structural body 450 made of cordierite and catalyst (not shown) made of noble metal. Similar to the S/C 45, the UF/C 46 has a honeycomb structural body 460 made of cordierite and catalyst (not shown) such as noble metal. The noble metal as catalyst is supported in each of the honeycomb structural body 450 and the honeycomb structural body 460. However, each of the honeycomb structural bodies 450, 460 has no plug member, i.e., both ends of each of the cells in the honeycomb structural bodies 450, 460 is open.

On the other hand, as shown in FIG. 4, the exhaust gas purification filter 1 according to the first exemplary embodiment is arranged at the downstream side of the UF/C 46, for example. The exhaust gas purification filter 1 according to the first exemplary embodiment filters and collects particulate matter (PM) contained in exhaust gas emitted from the gasoline direct injection engine 4.

A description will now be given of the method of producing the exhaust gas purification filter 1 according to the first exemplary embodiment.

First, cordierite raw material is prepared, which is used for producing the honeycomb structural body 2. The cordierite raw material contains silica, talc, kaolin, alumina, aluminum hydroxide, etc. Those components contained in the cordierite raw material are adjusted in order to have a final composition of the honeycomb structural body 2 after the completion of the firing process. The final composition of the honeycomb structural body 2 is silica ($SiO_2$) within a range of 47 to 53 mass %, aluminum hydroxide ($Al_2O_3$) within a range of 32 to 38 mass %, and magnesium oxide (MgO) within a range of 12 to 16 mass %.

The cordierite raw material is a clay mixture composed of solvent such as water, a thickener, a dispersant, etc.

The clay-like cordierite is fed and extruded to make a molded green body having a honeycomb structure by using a metal die (not shown). The molded green body is dried to produce the honeycomb structural body 2.

Next, raw material powder of silica, talc, kaolin, aluminum hydroxide, etc. is prepared, which is used for making the plug members 3. The raw material of the plug members 3 is adjusted in order to have a final composition of the plug members 3 after processing the firing process. The final composition of the plug members 3 is silica ($SiO_2$) within a range of 47 to 53 mass %, aluminum hydroxide ($Al_2O_3$) within a range of 32 to 38 mass %, and magnesium oxide (MgO) within a range of 12 to 16 mass %.

The raw material of the plug members 3, a thickener and a dispersant are dissolved in a solvent such as water, oil, etc. to make slurry. It is possible for the slurry of the raw material of the plug members 3 to have a viscosity within a range of 500 to 1000 mPa·s. It is possible to produce the slurry of the plug members 3, for example, by using a mixer which mixes the raw material at 1000 rpm over 1 minute.

It is possible for the plug members 3 to have a desired porosity by adjusting a particle size and a bulk density of the raw material. Table 1 shows an average particle size of silica, talc, and alumina used in the first exemplary embodiment. The first exemplary embodiment uses the raw material A in Table 1 in order to produce the plug members 3.

Figure 5:
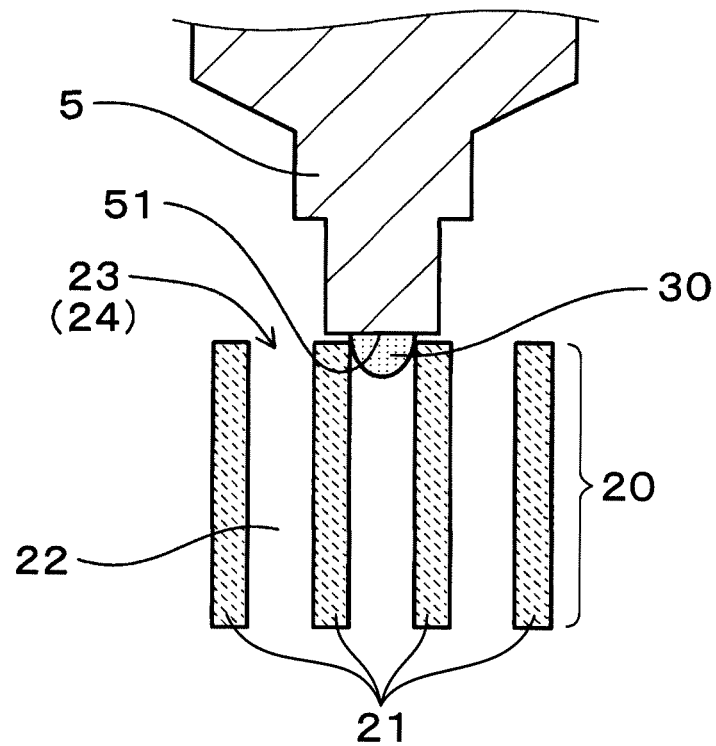
FIG. 5 is a view showing a partial cross section of a honeycomb structural body in which slurry is fed from one end of the honeycomb structural body by using a dispenser in a process of producing the exhaust gas purification filter according to the first exemplary embodiment of the present invention.
Figure 6:
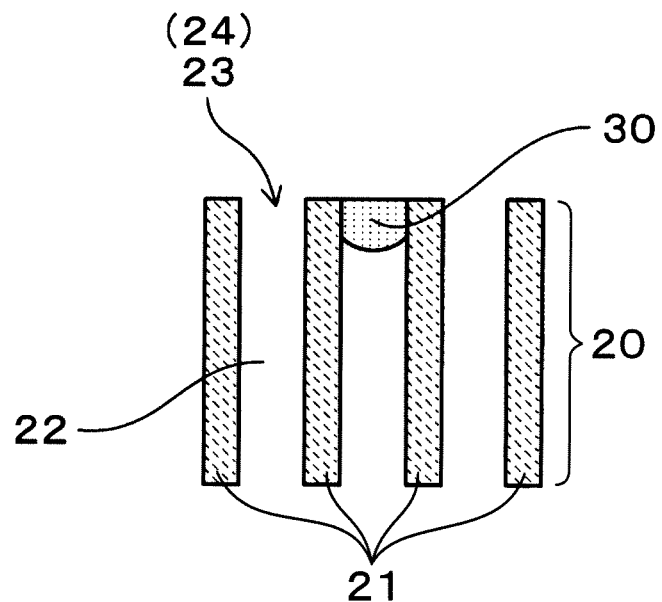
FIG. 6 is a view showing a partial cross section of the honeycomb structural body in which slurry has been fed from one end of the honeycomb structural body shown in FIG. 5.

FIG. 5 is a view showing a partial cross section of the honeycomb green body 20 in which the slurry 30 is fed from the end 23 (24) of the honeycomb structural body 1 by using a dispenser 5 in a process of producing the exhaust gas purification filter 1 according to the first exemplary embodiment. FIG. 6 is a view showing a partial cross section of the honeycomb green body 20 in which the slurry 30 has been fed from the end 23 (24) of the honeycomb structural body 1 shown in FIG. 5.

As shown in FIG. 5 and FIG. 6, the slurry 30 of the plug members 30 is introduced into the dispenser 5, and the slurry 30 is fed into the opening sections of the cells in the end 23 (24) of the honeycomb green body 20 through a nozzle 51 of the dispenser 5. The slurry 30 is extruded from the nozzle 51 of the dispenser 5 by a predetermined air pressure. It is preferable to contact the nozzle 51 of the dispenser 5 to the end 23 (24) of the honeycomb green body 20. In other words, it is preferable to have a small gap between the nozzle 51 of the dispenser 5 and the end 23 (24) of the honeycomb green body 20 as small as possible. This makes it possible to prevent leakage of the slurry 30 from the target opening section of the cell 22 to the opening section of the adjacent cell 22 on the end 23 (24) of the honeycomb green body 20. The slurry 30 is fed to the ends 23 and 24 of the honeycomb green body 20 by using the dispenser 5. The dispenser 5 has the nozzle 51 of an inner diameter of 0.8 mm at an air pressure within a range of 0.1 to 0.4 MPa for a time length within a range of 10 to 20 milliseconds.

When an inner diameter of the nozzle 51 of the dispenser 5 is a small size, there is a possible clogging of the slurry 30 in the nozzle 51 of the dispenser 5. Further, there is a possible difficulty of making the plug member 30 having a predetermined length measured from the end 23 (24) of the honeycomb green body 20.

On the other hand, when an inner diameter of the nozzle 51 of the dispenser 5 is large, there is a possible incorrect injection of the slurry 30 to other opening sections which are formed adjacent to the target opening section on the end 23 (24) of the honeycomb green body 20. Accordingly, it is preferable for the nozzle 51 of the dispenser 5 to have the inner diameter within a sum of the opening pitch of the cells 22±twice the thickness of the partition walls 21. For example, it is preferable for the nozzle 51 to have an inner diameter within a range of 0.4 to 1.2 mm. An actual example of the inner diameter of the nozzle 51 of the dispenser 5 is 0.8 mm.

Next, after the drying process of the honeycomb green body 20 in which the slurry 30 has been injected through the nozzle 51 of the dispenser 5 and the plug members 30 have been formed, the firing process fires the honeycomb green body 20 to produce the honeycomb structural body 2 as a sintered body. The honeycomb structural body 2 has the plug members 3 formed on the ends 23 and 24 thereof.

Figure 3:
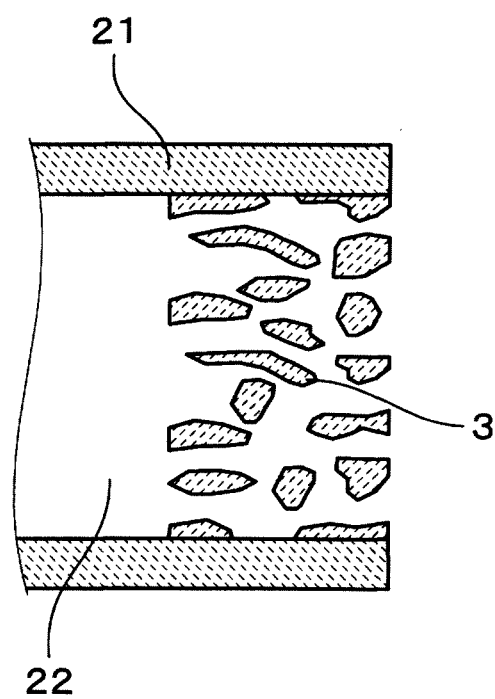
FIG. 3 is a view showing a partial cross section of a cell having a plug member in the exhaust gas purification filter according to the first exemplary embodiment of the present invention.

FIG. 3 is a view showing a partial cross section of the cell 22 having the plug member 3. The plug member 3 has a porous structure formed between the partition walls 21 in the exhaust gas purification filter 1 according to the first exemplary embodiment.

As shown in FIG. 1, FIG. 2 and FIG. 3, the exhaust gas purification filter 1 according to the first exemplary embodiment can be produced by the method previously described.

In the method previously described, the slurry 30 is fed into the cells 22 in the honeycomb green body 20 before the drying process and the firing process. However, it is possible to feed the slurry 30 into the cells 22 of the honeycomb structural body 2 to make the plug members 3 after the drying process and the firing process.

Next, a description will now be given of the method of measuring the parameters such as an average length L, an average pore size (or an average pore diameter) D and a porosity P of the plug members 3 formed in the cells 22 of the exhaust gas purification filter 1 according to the first exemplary embodiment.

(Average Length L of the Plug Members 3)

A metal rod (approximately having a diameter of 0.8 mm) is inserted into an opening section of a cell 22 and an inserted length of the metal rod in the cell 22 is measured. A length of the plug member 3 is detected on the basis of a difference between the total length of the cell 22 and the inserted length of the metal rod. Next, an average length L of arbitrary nine plug members 3 which are arranged at regular intervals on one end surface 23, 24 is obtained.

It is possible to detect the average pore diameter D and the porosity P of the plug members 3 by a mercury intrusion method such as a mercury porosimetetry.

The mercury intrusion method detects a pore diameter D of the plug member 3 on the basis of a pressure when mercury enters into the inside of pores of the plug members 3, and further calculates a pore volume on the basis of a volume of the mercury entered into the inside of the pores of the plug members 3. The mercury intrusion method further calculates the average pore diameter D on the basis of the calculated average pore diameter. The mercury intrusion method calculates the porosity P on the basis of the equation:

$$\text{Porosity } P = \text{pore volume} \div (\text{pore volume} + 1/2.52) \times 100.$$

Table 2 shows the calculation results of these parameters.

(Test Samples According to Second to Fourth Exemplary Embodiments and First to Third Comparative Embodiments)

A description will be given of the experiment of test samples according to second to fourth exemplary embodiments and first to third comparative embodiments.

In the experiment of the test samples as the exhaust gas purification filters according to the second to fourth exemplary embodiments were prepared, which are different in average length L, average pore diameter D and porosity P of the plug members from the exhaust gas purification filter according to the first exemplary embodiment. The average length L of the plug members in the test samples was adjusted by changing an air pressure when slurry was introduced into the opening sections of the cells of the test samples.

The average pore diameter D and the porosity P of the plug members in the test samples were adjusted by changing types A, B and C of raw material of the plug members. The types A, B and C of raw material of the plug members have a different average particle size of silica, talc and alumina (see Table 1). Other components of the exhaust gas purification filters according to the test samples are the same components of the exhaust gas purification filter according to the first exemplary embodiment. The same components between the first to fourth exemplary embodiments and the comparative embodiments will be referred by the same (Comparison in Pressure Loss and PM Collection Rate Between the Test Samples According to the First to Fourth Exemplary Embodiments and the Comparative Embodiments)

A description will now be given of the comparison in pressure loss and PM collection rate between the test samples according to the first to fourth exemplary embodiments and the comparative embodiments.

A pressure loss of the exhaust gas purification filter as each of the test samples was detected by using a pressure loss detection device while supplying gas (air) into the inside of the cells of each of the test samples. The pressure loss detection device is equipped with a differential pressure gauge and a blower. The differential pressure gauge detects a difference in pressure of the gas at the location immediately before the test sample and the location immediately following the test sample. The blower supplies the gas (air) into the inside of the cells in the exhaust gas purification filter as each test sample.

Specifically, a first pipe is connected to a first end of the test sample and a second pipe is connected to a second end of the test sample in order to introduce the gas (air) into the test sample. The blower supplies the gas into the first pipe. That is, gas is introduced through the first end and discharged from the second end of the test sample. The differential pressure gauge detects a pressure at the first end of the test sample and a pressure at the second end of the test sample. A difference between these detected pressures indicates a pressure loss of the test sample. For example, the blower supplies gas at a flow rate of 7 m³/minute into each of the test samples, i.e. the exhaust gas purification filters. The differential pressure gauge detects a pressure at the first end and a pressure at the second end of each test sample. Table 2 and FIG. 7 show the detection results of the pressure loss of each test sample.

Figure 7:
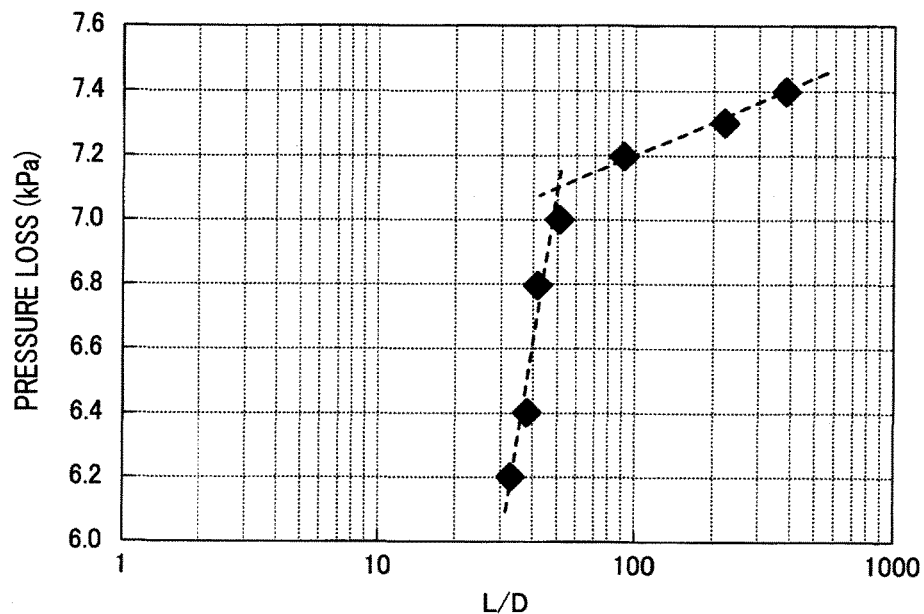
FIG. 7 is a view explaining a relationship between a ratio L/D and a pressure loss in test samples according to the first to fourth exemplary embodiments and first to third comparative embodiments.

FIG. 7 is a view explaining a relationship between a ratio LID and a pressure loss in the test samples according to the first to fourth exemplary embodiments and the first to third comparative embodiments.

The experiment detected a PM collection rate (%) of the exhaust gas purification filter as each of the test samples according to the first to fourth exemplary embodiments and the comparative embodiments. The PM collection rate (%) indicates a rate of PM contained in exhaust gas emitted from a gasoline direct injection engine, i.e. a gasoline direct injection engine.

Specifically, the number of PM contained in 2 liters of exhaust gas emitted from a gasoline direct injection engine was detected at the first end and the second end of each test sample. The PM collection rate (%) of each test sample was detected. The PM collection rate (%) indicates a rate (%) of PM collected by the exhaust gas purification filter as the test sample. For example, it is possible to calculate the PM collection rate C (%) by using the following equation:

$$C=(A-B)\times 100/A,$$

where the number of PM particles contained in exhaust gas emitted from the gasoline direct injection engine was detected at the first end of the test sample is designated by reference character A, and the number of PM particles contained in the exhaust gas emitted from the second end of the test sample is designated by reference character B.

The number of PM particles contained in exhaust gas was detected by using a particulate analyzer DMS500 (manufactured by CAMBUSTION Ltd.) The measurement conditions are as follows:

Gasoline engine rotation speed: 2,000 rpm;

Flow rate of exhaust gas: 40 L/sec.; and

Temperature of exhaust gas (at a location immediately before the first end of the exhaust gas purification filter as test sample: 450° C.

PM in exhaust gas immediately before the exhaust gas purification filter had an average particle size of 70 nm. The number of PM particles at a location immediately before the first end of the exhaust gas purification filter as test sample was $5\times10^6/cm^3$. Further, the number of PM particles at the location immediately after the second end of the exhaust gas purification filter as test sample was detected after 1,225 seconds counted from the timing when the exhaust gas was introduced into the first end of the exhaust gas purification filter as test sample. This makes it possible to have the same number of PM particles as that contained in exhaust gas emitted from a diesel engine (which will be explained later). Table 2 and FIG. 8 show the detection results of the PM collection rate (%) of each test sample by using the gasoline direct injection engine.

Figure 8:
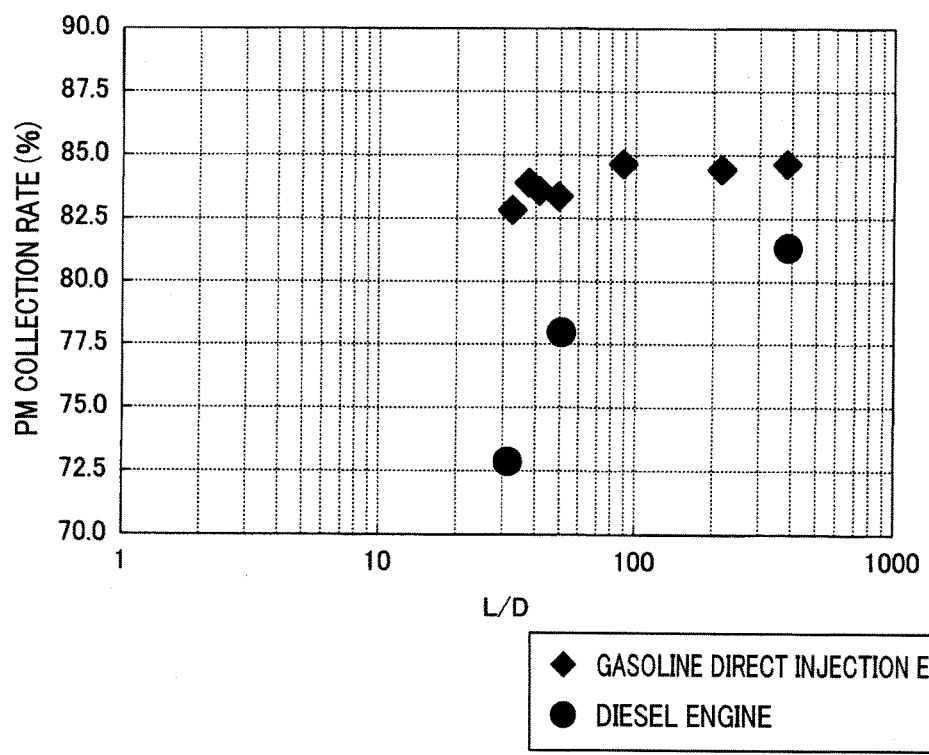
FIG. 8 is a view explaining a relationship between the ratio L/D and a PM collection rate in the test samples according to the first to fourth exemplary embodiments and the first to third comparative embodiments.

FIG. 8 is a view explaining a relationship between the ratio LID and a PM collection rate (%) in the test samples according to the first to fourth exemplary embodiments and the first to third comparative embodiments.

Still further, a PM collection rate (%) of the exhaust gas purification filter as test sample according to the second and fourth exemplary embodiments and the first comparative embodiment was detected. The PM collection rate (%) indicates a rate of PM contained in exhaust gas emitted from a 2 liter diesel engine. The detection was performed by the same method of the gasoline direct injection engine as previously described. The measurement conditions of the diesel engine are as follows:

Diesel engine rotation speed: 1200 rpm;

Flow rate of exhaust gas: 35 L/sec.; and

Temperature of exhaust gas (at a location immediately before the first end of the exhaust gas purification filter as test sample: 350° C.

PM in exhaust gas immediately before the exhaust gas purification filter had an average particle size of 90 nm. The number of PM at a location immediately before the first end of the exhaust gas purification filter as test sample was $7\times10^7/cm^3$. The number of PM at the location immediately after the second end of the exhaust gas purification filter as test sample was detected after 100 seconds counted from the timing when the exhaust gas was introduced into the first end of the exhaust gas purification filter as test sample.

Table 2 and FIG. 8 show the detection results of the PM collection rate (%) of each test sample by using the diesel engine.

TABLE 1

| Type of raw material | Average particle size (μm) of raw material | | |
|---|---|---|---|
| of plug members | Silica | Talc | Alumina |
| A | 23 | 32 | 5 |
| B | 49 | 32 | 5 |
| C | 5 | 32 | 5 |

TABLE 2

| Test sample No. | Type of raw material of plug members | Plug members L (mm) | D (mm) | L/D | P (%) | Thickness (mm) of partition wall | Pressure loss (kPa) | PM collection rate (%) Gasoline direct injection engine | Diesel engine |
|---|---|---|---|---|---|---|---|---|---|
| 1st. ex. em. | A | 2.2 | 0.052 | 42 | 61 | 0.2 | 6.8 | 83.6 | — |
| 2nd. ex. em. | B | 3 | 0.06 | 50 | 61 | 0.2 | 7.0 | 83.4 | 78 |
| 3rd. ex. em. | B | 2.3 | 0.06 | 38 | 61 | 0.2 | 6.4 | 83.9 | — |
| 4th. ex. em. | B | 2 | 0.06 | 33 | 61 | 0.2 | 6.2 | 82.8 | 73 |
| 1st. com. em. | C | 4.6 | 0.012 | 383 | 52 | 0.2 | 7.4 | 84.7 | 82 |
| 2nd. com. em. | C | 2.6 | 0.012 | 217 | 52 | 0.2 | 7.3 | 84.4 | — |
| 3rd. com. em. | A | 4.7 | 0.052 | 90 | 61 | 0.2 | 7.2 | 84.6 | — | ex. em.: exemplary embodiment, and
com. em.: comparative embodiment

As can be understood from the detection results shown in Table 2 and FIG. 7, the exhaust gas purification filters as the test samples according to the first to fourth exemplary embodiments satisfy the relationship of $L/D \leq 50$, and $L \leq 3$, where L is an average length (mm) of plug members 3, D is an average pore size (or a pore diameter) (mm) of the plug members 3.

The exhaust gas purification filters as the test samples according to the first to fourth exemplary embodiments have a pressure loss which is lower than a pressure loss of the exhaust gas purification filters as the test samples according to the first to third comparative embodiments. That is, the exhaust gas purification filters according to the first to fourth exemplary embodiments can prevent decreasing of its output.

The exhaust gas purification filters as the test samples according to the first to fourth exemplary embodiments are used by a gasoline direct injection engine 4 (see FIG. 4). The gasoline direct injection engine 4 emits exhaust gas having a temperature of not less than 450° C., for example. This makes it possible to increase Brownian motion, i.e. the random motion of particulate matter PM contained in exhaust gas. As a result, the exhaust gas purification filter 1 collects PM in the random motion (Brownian motion). In this case, even if the exhaust gas purification filter 1 satisfies the relationship of $L/D \leq 50$, and $L \leq 3$, it is possible for the exhaust gas purification filter 1 to adequately collect PM contained in exhaust gas. As can be understood from the detection results shown in Table 2 and FIG. 8, the exhaust gas purification filter 1 as the test samples which satisfy the relationship of $L/D \leq 50$, and $L \leq 3$ has a low PM collection rate (%) when used in the diesel engine.

On the other hand, the exhaust gas purification filter 1 as the test samples which satisfy the relationship of $L/D \leq 50$, and $L \leq 3$ has a high, i.e. excellent PM collection rate (%) when used in the gasoline direct injection engine. Accordingly, when the exhaust gas purification filter 1 which satisfies the relationship of $L/D \leq 50$, and $L \leq 3$ is used in gasoline direct injection engines, it is possible to have an excellent PM collection rate (%) and decrease its pressure loss simultaneously.

It is preferable for the exhaust gas purification filter to satisfy a relationship of $L > T$, where L is an average length (mm) of the plug members 3 and T is a thickness (mm) of the partition wall 21. This structure makes it possible to adequately collect PM contained in exhaust gas by the plug members 3. From the viewpoint of the PM collection, it is more preferable for the exhaust gas purification filter to satisfy a relationship of $L \geq 5 \times T$, and most preferable to satisfy a relationship of $L \geq 10 \times T$.

It is further preferable for the plug members 3 to have an average length L (mm) which satisfies a relationship of $L \leq 2.5$. This structure makes it possible to more decrease a pressure loss of the exhaust gas purification filter (see the first, third and fourth exemplary embodiments).

It is more preferable for the plug members 3 of the exhaust gas purification filter to satisfy a relationship of $L/D \leq 40$, where L indicates an average length (mm) of the plug members 3, and D indicates an average pore size (pore diameter) (mm) of the plug members 3. In this case, it is possible to further decrease a pressure loss of the exhaust gas purification filter (see the third and fourth exemplary embodiments).

From the viewpoint of more increasing the PM collection rate (%), it is preferable for the average length of the plug members 3 to have a relationship of $L \geq 0.1$, and more preferable to have a relationship of $L \geq 0.5$, and most preferable to have a relationship of $L \geq 2$.

Furthermore, from the viewpoint of more increasing the PM collection rate and decreasing the pressure loss of the exhaust gas purification filter, it is preferable for the exhaust gas purification filter to have a relationship of $0.05 < D < 0.1$.

It is preferable for the plug members 3 of the exhaust gas purification filter to have a porosity of $P \geq 50$. This structure makes it possible to more decrease a pressure loss of the exhaust gas purification filter. It is more preferable for the plug members 3 of the exhaust gas purification filter to have the porosity of $P \geq 55$, and most preferable to have the porosity of $P \geq 60$.

It is preferable to mount the exhaust gas purification filter 1 according to the exemplary embodiment of the present invention to gasoline direct injection engines. That is, there is a certain tendency for PM emitted from a gasoline direct injection engine to have a small average particle size. It is therefore to have a great effect on the PM collection of the exhaust gas purification filter for use in gasoline direct injection engines on the basis of Brownian motion. The exhaust gas purification filter according to the first to fourth exemplary embodiments previously described has the functions to adequately collect PM contained in exhaust gas emitted from gasoline direct injection engines while decreasing and maintaining its pressure loss.

In addition to the futures and effects previously described, the plug members 3 of the exhaust gas purification filter according to the first to fourth exemplary embodiments are made of cordierite. In particular, the plug members 3 are made of raw materials composed of silica, talc, alumina, etc. in which it is preferable that silica has an average particle size within a range of 40 to 80 μm, talc has an average particle size within a range of 20 to 50 μm and alumina has an average particle size within a range of 4 to 10 μm. This structure makes it possible to adequately satisfy the important relationship of L/D≤50, and L≤3, where L is an average length (mm) of the plug members 3 and D is an average pore size (or pore diameter) (mm) of the plug members 3. It is also acceptable to use aluminum hydroxide instead of alumina in order to form the plug members 3. It is also possible to use a mixture of alumina and aluminum hydroxide. Form the same point of view, it is preferable for aluminum hydroxide to have an average particle size within a range of 4 to 10 μm.

The average particle size of each of silica, alumina and/or aluminum hydroxide, talc contained in the plug members 3 was obtained on the basis of its particle distribution when an integrated volume value thereof is 50% measured by the Laser Diffraction and Scattering method. It is preferable for the silica to have a bulk density within a range of 0.1 to 0.7 g/cc. This structure makes it possible to easily form the plug members 3 which satisfy the important relationship of P≥5.0.

Fifth Exemplary Embodiment

A description will be given of a method of forming the plug members 3 in the exhaust gas purification filter according to the fifth exemplary embodiment with reference to FIG. 9 and FIG. 10.

As previously described, the exhaust gas purification filter according to the first to fourth exemplary embodiments is formed by using the dispenser 5 (see FIG. 5). It is possible to form the plug members 3 by using a jet dispenser (which is designated by reference character 6 shown in FIG. 9) which is easily available in the commercial market.

Figure 9:
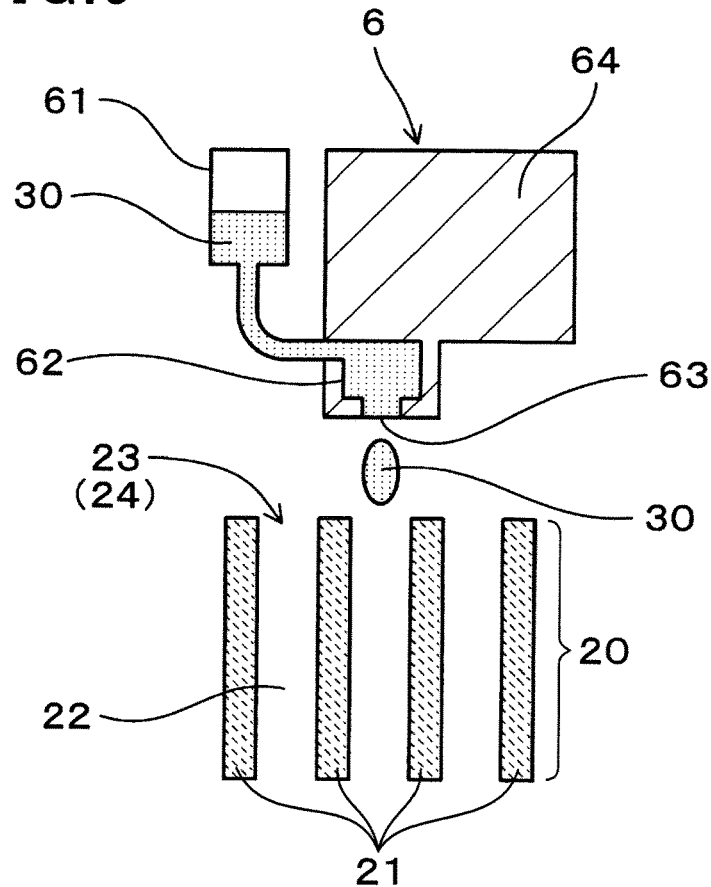
FIG. 9 is a view showing a partial cross section of the honeycomb structural body when slurry is fed into the end of honeycomb structural body by using a jet dispenser according to a fifth exemplary embodiment of the present invention.

FIG. 9 is a view showing a partial cross section of the honeycomb structural body when slurry 30 is fed into the end 23 (24) of the honeycomb structural body 2 by using the jet dispenser 6 according to the fifth exemplary embodiment. FIG. 10 is a view showing a partial cross section of the honeycomb structural body 2 after slurry has been fed into the end 23 (24) of the honeycomb structural body 2 by using the jet dispenser 6 according to the fifth exemplary embodiment.

Figure 10:
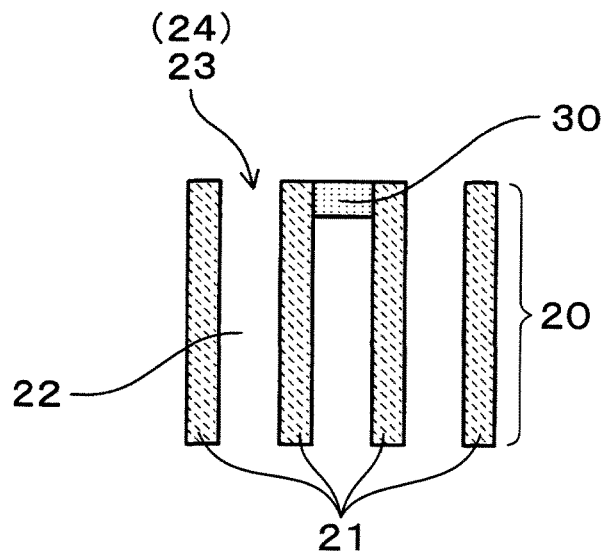
FIG. 10 is a view showing a partial cross section of the honeycomb structural body after slurry has been fed into the end of the honeycomb structural body by using the jet dispenser according to the fifth exemplary embodiment of the present invention.

As shown in FIG. 9 and FIG. 10, the jet dispenser 6 injects slurry on the end surface 23 (24) of the honeycomb green body 20 while maintaining a predetermined gap between the end surface 23 (24) and a nozzle 63 of the jet dispenser 6. The jet dispenser 6 is comprised of a tank 61, a chamber 62, the nozzle 63 and an injection device 64. The tank 61 stores the slurry 30. The chamber 62 stores the slurry 30 having a predetermined amount to be injected through the nozzle 63 to the end surface 23 (24) of the honeycomb green body 20. The injection device 64 instructs the nozzle 63 to inject the slurry 30 of the predetermined amount stored in the chamber 62 to target opening sections of the target cells 22 on the end surface 23 (24) of the honeycomb green body 20. Using the jet dispenser 6 makes it possible to more reduce the injection period of time to form the plug members 3. It is accordingly possible to form the exhaust gas purification filter with the plug members 3 formed in the ends 23 and 24 by using the jet dispenser 6, similar to the method of producing the exhaust gas purification filter according to the first to fourth exemplary embodiments.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An exhaust gas purification filter capable of collecting particulate matter emitted from a gasoline direct injection engine, comprising a honeycomb structural body, wherein
    the honeycomb structural body comprises a plurality of cells, partition walls and plug members, each of the cells is surrounded by the partition walls, each of the plug members is formed at one end of each of the cells to plug an opening section of the one end of each of the cells, and
    the plug members have a porous structure including pores, and satisfy a relationship of L/D≤50 and L≤3, where L is an average length (mm) of the plug members, D is an average pore size (mm) of the plug members, and D is more than 0.018 (mm), and an average pore size (mm) of the honeycomb structural body is smaller than the average pore size of the plug member.

2. The exhaust gas purification filter according to claim 1, wherein the plug members satisfy a relationship of L>T, where L is an average length (mm) of the plug members and T is a thickness (mm) of the partition wall.

3. The exhaust gas purification filter according to claim 1, wherein the plug members satisfy a relationship of L/D≤40.

4. The exhaust gas purification filter according to claim 1, wherein the plug members satisfy a relationship of L≤2.5, where L indicates an average length (mm) of the plug members.

5. The exhaust gas purification filter according to claim 1, wherein the pores in the plug members satisfy a relationship of P≥50, where P indicates a porosity of the plug members as a percentage.

6. The exhaust gas purification filter according to claim 1, wherein the exhaust gas purification filter is used in a gasoline direct injection engine in order to collect particulate matter contained in and purify exhaust gas emitted from the gasoline direct injection engine.

7. A method of producing the exhaust gas purification filter according to claim 1, comprising steps of:
    injecting slurry to end surfaces of a honeycomb structural body by using a dispenser in order to feed the slurry into opening sections of cells on the end surfaces of the honeycomb structural body; and
    firing the honeycomb structural body having the plug members to produce the exhaust gas purification filter.

8. The method of producing the exhaust gas purification filter according to claim 7, wherein the dispenser is a jet dispenser.

9. The exhaust gas purification filter according to claim 1, wherein the plug members are made of cordierite containing silica, talc, and alumina, wherein the silica has an average particle size within a range of 40 to 80 μm, the talc has an average particle size within a range of 20 to 50 μm and the alumina has an average particle size within a range of 4 to 10 μm.

10. The exhaust gas purification filter according to claim 1, wherein the plug members are made of cordierite containing silica, talc, and aluminum hydroxide, wherein the silica has an average particle size within a range of 40 to 80 μm, the talc has an average particle size within a range of 20 to 50 μm and the aluminum hydroxide has an average particle size within a range of 4 to 10 μm.

11. The exhaust gas purification filter according to claim 9, wherein the cordierite forming the plug members further contains a mixture of alumina and aluminum hydroxide, wherein the aluminum hydroxide has an average particle size within a range of 4 to 10 μm.

12. The exhaust gas purification filter according to claim 9, wherein the silica in the cordierite has a bulk density within a range of 0.1 to 0.7 g/cc.

13. The exhaust gas purification filter according to claim 1, wherein the partition walls and the plug members forming the honeycomb structural body are made of cordierite.

14. The exhaust gas purification filter according to claim 1, wherein $0.05 < D < 0.1$.

* * * * *